June 19, 1934.  A. E. F. BILLSTEIN  1,963,931
RAIL TESTING APPARATUS
Filed Aug. 9, 1933  2 Sheets-Sheet 1
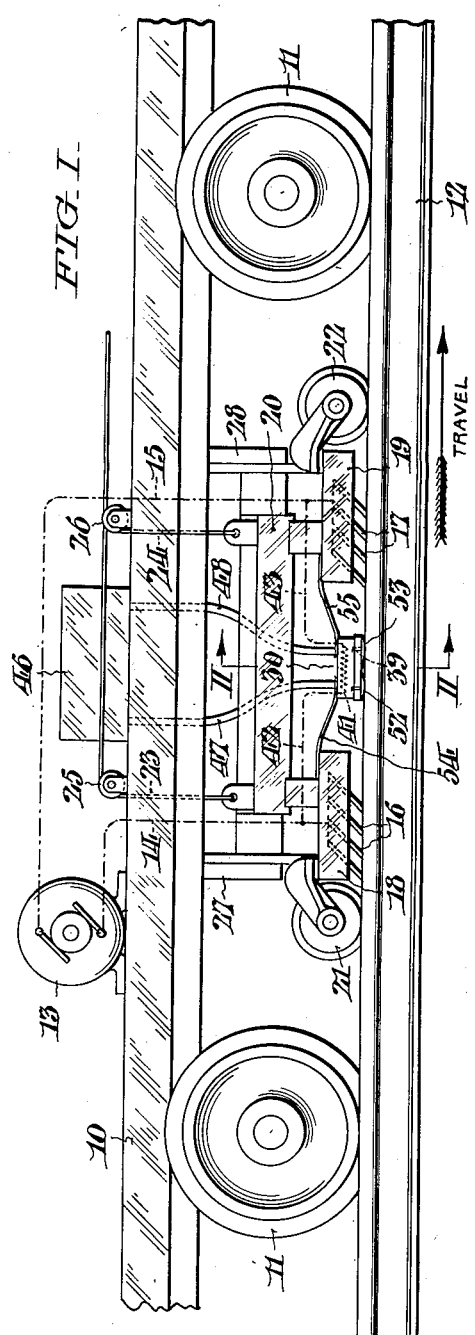
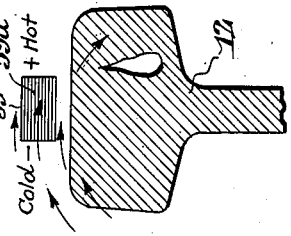
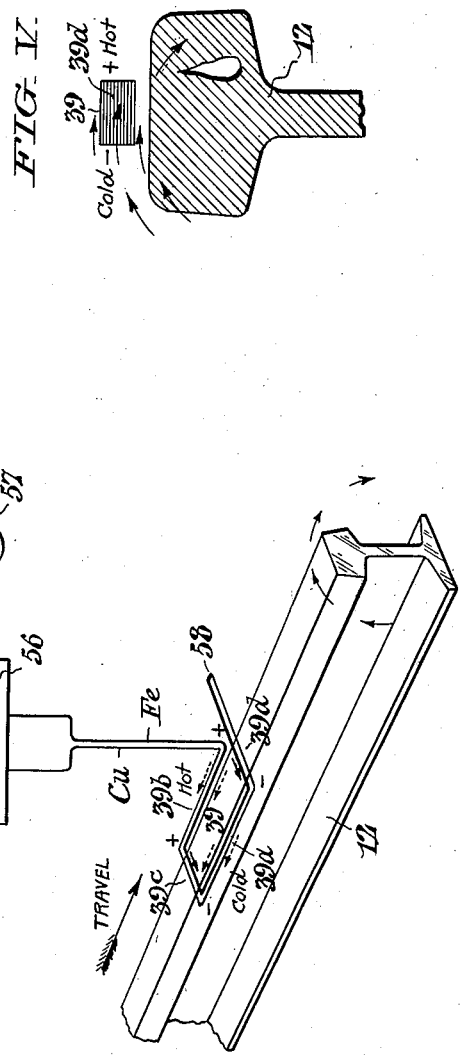
WITNESSES:
John E. Bergner
John A. Weidler
INVENTOR:
Arthur E. F. Billstein,
BY Fraley Paul
ATTORNEYS.

June 19, 1934. A. E. F. BILLSTEIN 1,963,931
RAIL TESTING APPARATUS
Filed Aug. 9, 1933 2 Sheets-Sheet 2
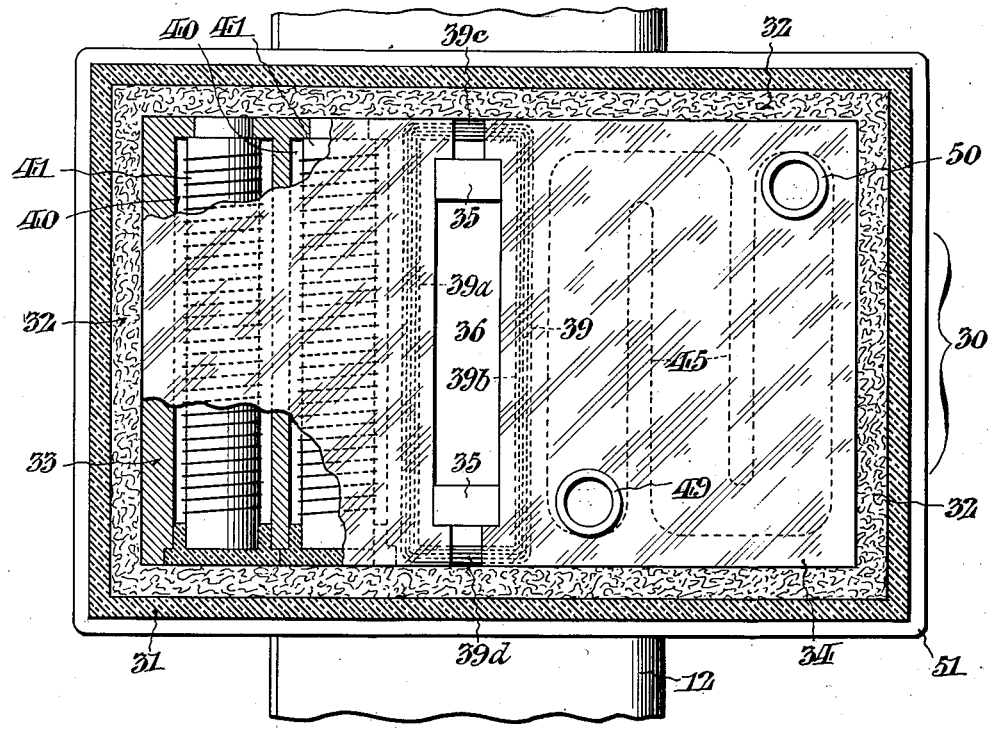
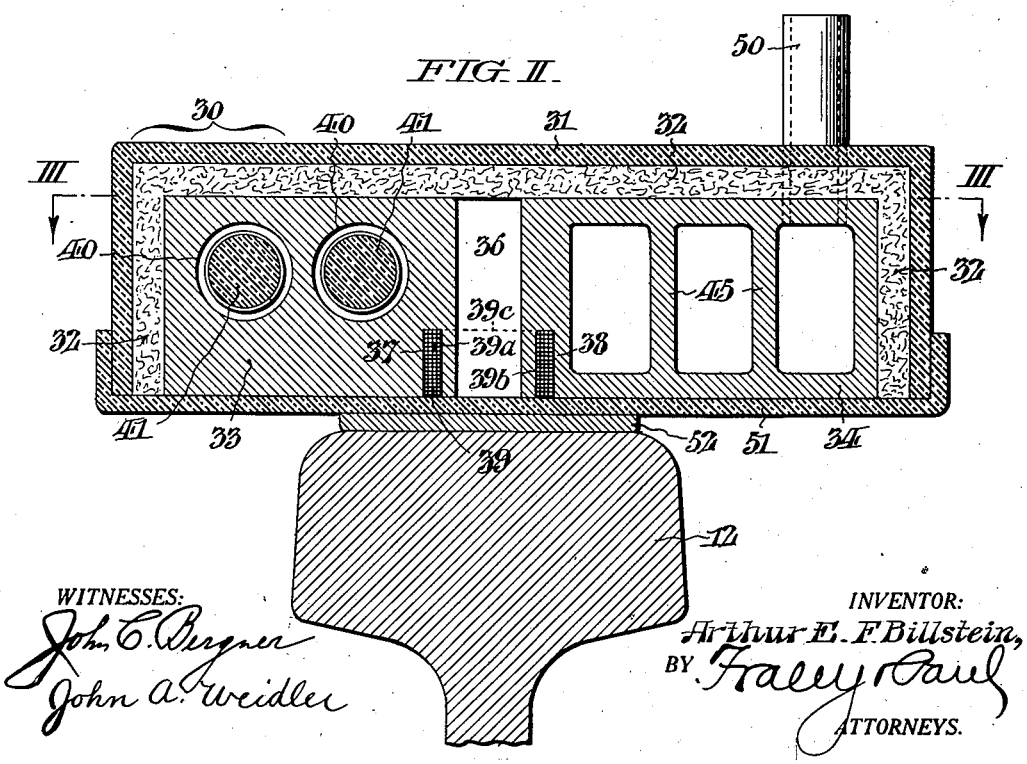
WITNESSES:
John C. Bergner
John A. Weidler
INVENTOR:
Arthur E. F. Billstein,
BY Fraley Paul
ATTORNEYS.

Patented June 19, 1934

1,963,931

UNITED STATES PATENT OFFICE 1,963,931

RAIL TESTING APPARATUS

Arthur E. F. Billstein, Altoona, Pa., assignor to The Pennsylvania Railroad Company, Philadelphia, Pa., a corporation of Pennsylvania Application August 9, 1933, Serial No. 684,377

10 Claims. (Cl. 175—183)

This invention relates to apparatus for testing track rails and the like for flaws, fissures, cracks and other imperfections, such as are not discernible by inspection from the exterior; and it has reference more particularly to testing apparatus wherein the detection of imperfections in the rails is effected through variations in magnetic flux produced by passage of electric current locally through the rails as the latter are being overtravelled.

To date, various types of apparatus operating under the above principle have been devised for track rail testing purposes; but these I have found to be more or less unreliable in that the detectors used in them responded to influences or disturbances other than the impulses produced by the magnetic flux variations due to imperfections in the rails, such as burns caused by locomotive driver wheels slipping, corrugations, etc. Accordingly, the indications or recordings resulting from the impulses received by heretofore existent apparatus were not sufficiently accurate in determining the exact locations or the true character of the imperfections in the rails.

The chief aim of my invention is to overcome the drawbacks which have been pointed out; or in other words, my invention is directed toward the provision of a track rail testing apparatus in which the detector is highly sensitive to magnetic flux variations occasioned by imperfections in a track rail, and yet immune against the influence of other disturbances such as above mentioned. Thus the indications produced by the impulses received by the detector coil serve to designate, with reliable definiteness and accuracy, the exact location as well as the character of the imperfections.

Other objects and attendant advantages of this invention will be manifest from the detailed description which follows in connection with the attached drawings, wherein Fig. I is a fragmentary side view of an inspection car equipped with rail testing apparatus conveniently incorporating the present improvements.

Fig. II is a sectional view taken as indicated by the arrows II—II in Fig. I crosswise through the detector of the apparatus.

Fig. III is a plan sectional view of the detector taken as indicated by the arrows III—III in Fig. II.

Fig. IV is a conventional view showing the "hook up" or wiring diagram of the detector; and Fig. V is a supplemental diagrammatic view showing how the detector is influenced by a distorted or displaced magnetic field due to an imperfection in the rail being tested.

With reference first more particularly to Fig. I of the illustrations, the numeral 10 designates the platform of the inspection car, and 11 the truck wheels of the car running on the track rail 12 which is to be tested. A generator 13 supported on the car platform 10 supplies electric current, through conductors 14 and 15, to spaced spring contact brushes 16 and 17 bearing on the top surface of the rail 12. Accordingly as the car travels over the rail 12 electric current is passed through it in the interval between the brushes 16 and 17 with attendant creation of magnetic flux locally around the rail. As shown, the brushes 16 and 17 are secured in holders 18 and 19 on a supplemental carriage 20 disposed intermediate the car wheels 11 and having wheels 21, 22 of its own to run on the track 12. In order that the carriage 20 may be lifted clear of the rail 12 while the equipment is enroute from one location of operations to another, a suitable lifting tackle is provided. As shown, the tackle includes cables 23, 24 which pass about pulleys 25, 26 on the inspection car platform 10, the carriage 20 being confined to vertical movement incident to being lifted, by guides 27, 28 pendant from the car.

For the purpose of detecting flaws or other imperfections in the rail through variations in the flux or through distortion or shifting of the same, I have devised a detector which is comprehensively designated 30 in Fig. I, and illustrated in detail on a larger scale in Figs. II and III. From the latter two illustrations, it will be observed that the detector 30 comprises a casing 31 of dielectric material, which, with interposition of thermo-insulating material 32, encloses a pair of blocks 33 and 34 both preferably of copper or other metal or material of high heat conductivity. As shown, the blocks 33 and 34 are serially arranged crosswise of the rail and held from direct contact by a pair of thermo-insulate separators 35 with formation of a dead air insulating space 36 between them. The bottom faces of the blocks 33, 34 immediately inward respectively of the contiguous ends of the latter are formed with transverse recesses or grooves 37, 38 for the accommodation of an upwardly inset rectangularly oblong coil 39 having long and short sides 39a, 39b and 39c, 39d respectively, the long sides 39a, 39b lying lengthwise of the rail 12, and the short sides 39c and 39d crosswise of said rail as shown in Fig. III. The block 33 which serves the long side 39a of the coil 39 has transverse cavities 40 side by side accommodating a pair of coil heaters 41. As shown in Fig. I, the coil heaters 41 receive electric current from the generator 13 through branch conductor wires 42, 43 connected for convenience of illustration, to the conductors 14, 15 previously referred to. The block 34 which serves the other long side 39b of the detector coil 39 is made hollow and provided with a number of baffles 45 at the interior, with resultant formation of a devious passage therethrough for circulation of a fluent cooling medium. This cooling medium is chilled in a refrigerator 46 on the car platform (Fig. I) and constantly recirculated through flexible flow and return tubes 47 and 48 which connect with nipples 49 and 50 (Figs. II and III) on the block 34. In direct line with the shorter sides 39c, 39d of the detector coil 39, the bottom 51 of the casing of the detector is fitted with metallic shoes 52, 53, which, as shown in Figs. I and III, contact with the rail 12, the bottoms of the shoes having a curvature corresponding to that of the drive wheels of locomotives or electric cars. Accordingly, the short sides 39c and 39d (which are very narrow as compared with the width of the rail) of the detector coil 39 will be maintained at all times in definitely spaced relation to the top surface of the rail 12 notwithstanding imperfections in the latter, to the end that varying air gaps and disturbances resulting from them are effectively eliminated. Referring again to Fig. I, the detector 30 occupies a position midway between the brushes 16, 17 and is supported by a pair of leaf spring arms 54, 55 which respectively reach from the brush holders 18, 19 and yieldingly urge the detector downward so that the shoes 52 and 53 firmly engage the track rail 12. The detector 30 is thus floatingly supported with capacity to adapt itself to surface irregularities of the rail incident to being slid therealong.

In order to facilitate the understanding of the operation of the detector coil 39 I have shown the same in Fig. IV as consisting of but a single turn. As illustrated, the detector coil 39 is formed from two different wires indicated respectively by heavy and light lines, the heavy wire being of ferro-magnetic metal and the light wire of a nonmagnetic metal such as copper, it being understood that the shading employed is for the purposes of distinguishing the wires and that it is not to be construed as an indication of differences in gauge. In forming the coil 39 the two wires are first joined together at one end, twisted together, and afterwards wound as one into the rectangular configuration shown in Fig. III on a suitable mandrel. The other ends of the detector coil wires are connected, as shown in Fig. IV, to a conventional form of amplifier 56 which is in circuit with a suitable current sensitive indicator 57 represented as having the form of a galvanometer.

It has been determined that a length of certain ferro-magnetic metals when chilled at one end and heated at the other for maintenance of a temperature gradient between said ends, and when laid parallel to the lines of force in a magnetic field, will have set up therein a measurable E. M. F. and current flow from the hot to the cold end, the maximum E. M. F. being obtained when the temperature of one end of the wire is above the "Curie" point. With other magnetic alloys for example of nickel and manganese in the proportion Ni0.6Mn, it has been furthermore found that the created currents under like conditions of environment will flow in the opposite direction or from the cold to the hot end of the wire. Non-magnetic wire of metals like copper, on the other hand, are not so influenced.

It is upon the foregoing discoveries that my present invention is based as will presently appear, the operation of the apparatus being as follows: Let it be assumed that the travel of the inspection car is in the direction of the large arrows in Figs. I and IV and that the lines of the magnetic flux produced around the rail 12 as a consequence of passage of electric current between the brushes 16, 17 are indicated by the small curved arrows in Fig. IV. Now, since the movement of the flux lines is crosswise of the top of the rail 12, the transversely-lying short sides 39c and 39d of the detector coil 39 wherein a temperature gradient is maintained through heating and chilling of the longer sides 39a, 39b of said coil as hereinbefore explained, an E. M. F. is set up in the same direction in the ferro-magnetic (shaded) wire in both of the said shorter sides from the cold ends to the hot ends, as indicated by the small straight full line arrows in Fig. IV. Thus, normally, with an unvarying flux, the two E. M. F.'s set up as just explained, oppose each other with the indicator 57 reading zero. When, however, through a flaw or fissure in the rail 12 the magnetic field is varied, or said field is laterally displaced as exemplified in Fig. V, when one of the shorter sides 39c or 39d of the detector coil 39 passes over the imperfection, the normal balance in the amplified circuit will obviously be disturbed with attendant indication of current flow at the indicator 57, this current being of course magnified in direct proportion to the number of individual wire lengths constituting each short side of said detector coil. During such detection, the flux around the rail 12 may vary due to changes of contact resistance between the rail 12 and the brushes 16, 17. These flux lines will cut the longer sides 39a, 39b of the detector coil 39, and accordingly another E. M. F. will be set up at the same time by induction tending to produce currents in both the magnetic and non-magnetic wires in the direction indicated by the small dotted arrows in Fig. IV. Due however to the hereinbefore described construction of the coil 39, these secondary currents will counterbalance or neutralize each other. For this reason and by virtue of the fact that the transverse short sides 39a, 39b of the detector coil 39 are maintained at a constant distance from the top surface of the rail 12, the impulses received by the amplifier 56 for detection are unaffected by any influences except those occasioned by the rail flaws; and my apparatus will therefore operate as a reliable means to perform the function for which it is designed. In order to obviate thermogenerative action in the detector coil 39, the joined ends of the component wires are extended as shown at 58 in Fig. IV for exposure to normal atmospheric temperatures.

In lieu of a galvanometer such as conventionally indicated at 57 as an indicating means in connection with my detecting apparatus, I may utilize a suitable audible signal means or well known automatically operated mechanism for discharging paint or other marking fluid against the rail at the regions of the detected flaws. Also, instead of the copper wire component, I may employ, for the purposes of a neutralizing component in association with the wire, wire of any other suitable metal or alloy in which the created currents will flow from the hot to the cold ends.

Having thus described my invention, I claim:

1. In track rail testing apparatus, a carriage adapted to travel along the rail being tested; means on the carriage to maintain a magnetic field locally around the rail; a detector on the carriage comprising an element of magnetic metal disposed transversely of the rail in proximity thereto; means for maintaining a temperature gradient between the ends of the element to render it susceptible to the influence of the crosswise horizontal flux lines of the magnetic field aforesaid for creation of an E. M. F. therein; and indicating means in circuit with the element actuated by current flow due to the imperfections in the rail.

2. In track rail testing apparatus, a carriage adapted to travel along the rail being tested; means on the carriage to maintain a magnetic field locally around the rail; a detector on the carriage comprising two spaced circuit-connected elements formed from magnetic metal and disposed transversely of the rail in proximity thereto; means for maintaining a temperature gradient between the ends of said elements so that the same are susceptible to the influence of the horizontal flux lines of the magnetic field for creation normally of equal and opposing E. M. F.'s in the circuit; and indicating means in the circuit actuated by flow of current incident to passage of one or the other of the elements over an imperfection in the rail.

3. In track rail testing apparatus, a carriage adapted to travel along the rail being tested; means on the carriage to maintain a magnetic field locally around the rail; a detector on the carriage in the form of a rectangular coil of magnetic wire vertically disposed in proximity to the rail with two of its sides lying transversely thereof; means for respectively heating and cooling the other two sides of the coil to render the transverse sides susceptible to the influence of the horizontal flux lines of the magnetic field for creation normally of like and opposing E. M. F.'s in them; and indicating means in circuit with the coil actuated by current flow when one or the other of the transverse sides of the coil passes an imperfection in the rail.

4. In track rail testing apparatus, a carriage adapted to travel along the rail being tested; means on the carriage to maintain a magnetic field locally around the rail; a detector on the carriage comprising a rectangular coil of magnetic wire vertically disposed in proximity to the rail with two of its sides lying transversely thereof; a block formed from material high in thermoconductivity affording a groove to receive one of the longitudinal sides of the coil, and having cavities containing heating means; and another block likewise of material high in thermo-conductivity affording a groove for the other longitudinal side of the coil and an internal hollow for circulation of a cooling medium whereby a temperature gradient is maintained in the transverse sides of the coil for susceptibility of the latter to the influence of the horizontal flux lines of the magnetic field and creation normally of like and opposing E. M. F.'s in them; and indicating means in circuit with the coil actuated by current flow when one or the other of the transverse sides of the detector coil passes an imperfection in the rail.

5. In track rail testing apparatus, a carriage adapted to travel along the rail being tested; means on the carriage to maintain a magnetic field locally around the rail; a detector on the carriage in the form of a quadrangular coil of magnetic wire vertically disposed in proximity to the rail with two of its sides lying transversely of the rail; means for respectively heating and cooling the other two sides of the coil to render the transverse sides susceptible to the influence of the crosswise horizontal flux lines of the magnetic field for creation normally of like and opposing E. M. F.'s in them; indicating means in circuit with the coil actuated by current resulting from variations in the field strength or by distortion or displacement of the field due to imperfections in the rail when one or the other of the transverse sides of the coil pass such imperfections; and means operative to render the coil immune from the influence of currents set up except as aforesaid.

6. In track rail testing apparatus, a carriage adapted to travel along the rail being tested; means on the carriage to maintain a magnetic field locally around the rail; a detector in the form of a rectangular coil having a winding of magnetic wire doubled with and connected at one end with a non-magnetic wire, said coil being vertically disposed in proximity to the rail with two of its sides lying transversely of the rail; means for respectively heating and cooling the other two sides of the coil to render the magnetic wires of the transverse sides susceptible to the influence of the crosswise horizontal flux lines of the magnetic field for creation normally of like and opposing E. M. F.'s in said transverse sides; and indicating means in circuit with the coil and actuated by current flow resulting from variations in the field strength or from distortion or displacement of the field due to imperfections in the rail when one or the other of the transverse sides of the coil pass such imperfections, the coil component formed by the non-magnetic wire serving to counteract the effects of currents set up in the magnetic wire by flux variations other than those produced as aforesaid.

7. In track rail testing apparatus, a carriage adapted to travel along the rail being tested; means on the carriage to maintain a magnetic field locally around the rail; a detector on the carriage in the form of a rectangular coil having a winding of magnetic iron wire doubled with and connected at one end to a magnetic wire consisting of an alloy of nickel and manganese, said coil being vertically disposed in proximity to the rail with two of its sides lying transversely of said rail; means for respectively heating and cooling the other two sides of the coil to render the magnetic wires of the transverse sides susceptible to the influence of the crosswise horizontal flux lines of the magnetic field for creation of like and opposing counterbalancing E. M. F.'s normally in them; and indicating means in circuit with the coil actuated by current flow resulting from variations in the field strength or from distortion or displacement of the field due to imperfections in the rail when one or the other of the transverse sides of the coil pass such imperfections, the coil component formed from the nickel alloy serving to counteract the effects of currents set up in the iron wire by flux variations other than those produced aforesaid.

8. In track rail testing apparatus, a carriage adapted to travel along the rail being tested; means on the carriage to maintain a magnetic field locally around the rail; a detector on the carriage comprising an element formed from magnetic metal disposed transversely of the rail in proximity thereto; a yieldingly-supported casing enclosing the element and having in vertical alignment therewith a shoe to contact with the rail, said shoe being rounded to correspond to the curvature of the drive wheels of locomotives or train cars so that said element is maintained in definitely spaced relation to the rail irrespective of irregularities in the surface of the latter caused by wheel burns; means for maintaining a temperature gradient between the ends of the element so that the latter is susceptible to the influence of the crosswise horizontal flux lines of the magnetic field aforesaid for creation of an E. M. F. therein; and an indicating or recording means in circuit with the element actuated by changes in the current flow due to imperfections in the rail.

9. In track rail testing apparatus, a carriage adapted to travel along the rail being tested; means on the carriage to maintain a magnetic field locally around the rail; a detector on the carriage comprising two spaced circuit-connected elements formed from magnetic metal and disposed transversely of the rail in proximity thereto; a yieldingly-supported casing enclosing said elements and having in vertical alignment with the latter, shoes to contact with the rail, said shoes being rounded to correspond with locomotive or train car drive wheels so that the detector elements are maintained in definitely spaced relation with the track rail irrespective of surface variations therein caused by wheel burns; means within the casing for maintaining a temperature gradient between the ends of the detector elements to render them susceptible to the influence of crosswise horizontal flux lines of the magnetic field for creation normally of equal and opposing E. M. F.'s in them; and indicating means in circuit with the detector elements actuated by current flow incident to passage of one or the other of the elements over an imperfection in the rail.

10. In track rail testing apparatus, a carriage adapted to travel along the rail being tested; means on the carriage to maintain a magnetic field locally around the rail; a detector on the carriage in the form of a quadrangular coil of magnetic wire vertically disposed in proximity to the rail with two of its sides lying transversely thereof; a casing housing the coil and having shoes in vertical alignment with the transverse coil ends to contact with the rail, said shoes being curved in conformity with the drive wheels of locomotive or train car wheels so that said coil ends are maintained in definite spaced relation to the track rail irrespective of irregularities in the latter caused by wheel burns; means in the casing for respectively heating and cooling the other two sides of the coil to render the transverse sides thereof susceptible to the influence of crosswise horizontal flux lines of the magnetic field for creation normally of like and opposing E. M. F.'s in them; and indicating means in the circuit with the coil actuated by current flow when one or the other of the transverse sides of the coil pass an imperfection in the rail.

ARTHUR E. F. BILLSTEIN.